March 1, 1960 E. P. G. WRIGHT ET AL 2,927,306

COMPUTING SYSTEMS

Filed Oct. 27, 1954 6 Sheets-Sheet 1

Inventors
E. P. G. WRIGHT-
J. RICE
By Robert Harding Jr.
Attorney

March 1, 1960 E. P. G. WRIGHT ET AL 2,927,306

COMPUTING SYSTEMS

Filed Oct. 27, 1954 6 Sheets-Sheet 2

Inventors
E. P. G. WRIGHT
J. RICE
By Robert Harding Jr.
Attorney

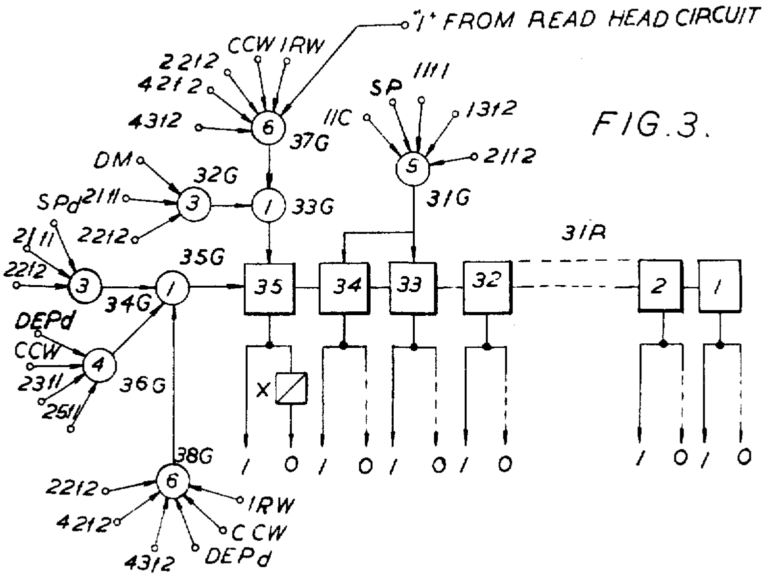
FIG. 3.
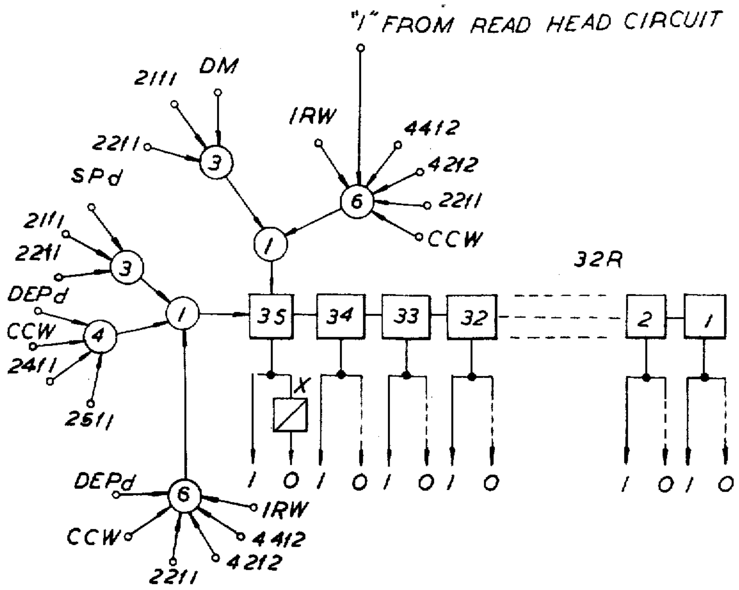
*Inventors*
E. P. G. WRIGHT-
J. RICE
By Robert Harding Jr.
*Attorney*

March 1, 1960 E. P. G. WRIGHT ET AL 2,927,306

COMPUTING SYSTEMS

Filed Oct. 27, 1954 6 Sheets-Sheet 4

Inventors
E. P. G. WRIGHT-
J. RICE

By Robert Harding Jr.
Attorney

Inventors
E. P. G. WRIGHT-
J. RICE
By Robert Harding Jr.
Attorney

Inventors
E. P. G. WRIGHT
J. RICE
By Robert Harding Jr.
Attorney

United States Patent Office 2,927,306
Patented Mar. 1, 1960

2,927,306

COMPUTING SYSTEMS

Esmond Philip Goodwin Wright and Joseph Rice, London, England, assignors to International Standard Electric Corporation, New York, N.Y.

Application October 27, 1954, Serial No. 465,051

Claims priority, application Great Britain October 30, 1953

16 Claims. (Cl. 340—174)

The present invention relates to instruction arrangements for the control of computing systems, of the composition of intelligence records, or any other purpose.

According to the present invention there is provided equipment for handling intelligence in various ways, comprising stores for individual predetermined instructions and a binary store for a selecting instruction having as many digit positions as there are individual instruction stores, each digit position indicating a corresponding instruction store, and means for utilising such of said predetermined instructions as are indicated by a selecting instruction stored in said binary store.

According to the present invention there is also provided a computer in which a number of predetermined instructions are stored in storage means, in which for a computation to be performed any one of a number of combinations of said stored instructions may be used, in which the sequence in which the instructions in a combination of said stored instructions are used is invariable, and in which when a computation is to be performed by the computer a selecting instruction is received by the computer which specifies which combination of said recorded instructions is to be used in respect of that computation.

The invention will now be described with reference to the accompanying drawings, in which:

Figs. 1 to 5 inclusive shown schematic circuits of an embodiment of the invention, while Fig. 6 is a block diagram of as much of a system in which the invention is used for the invention to be understood. Fig. 6, also includes a schematic representation of the arrangements for generating the various controlling pulse waveforms needed.

*Brief general description (Fig. 6)*

The most convenient way to describe the overall operation of the system shown schematically in Fig. 6 is to describe its operation under a number of separate headings. Several methods of operation are possible:

(*a*) Where each set of data is preceded by signals conveying all instructions for the computation to be performed on that data, i.e. alternate signals and data.

(*b*) Where a number of standard instructions are recorded, and each set of data is preceded by a instruction identifying the selection of the instructions to be used, i.e. the use of pre-recorded instructions.

*Alternate signals and data*

It is assumed that the instructions and data to be supplied to the computer are collated and recorded on magnetic tape in whatever code form is used in the computer. In the present case it is assumed that all numbers are expressed as binary numbers. Hence the input to the computer is formed by a magnetic tape reading machine 1, which, via a control circuit 2, supplies instructions and data to an inlet switch 3. Since instructions always precede data, the inlet switch 3 is normally set so as to feed the first received instruction to a decoder circuit 4, where it is temporarily stored.

At the end of the instruction, which in the present case relates to the next computation, the inlet switch 3 changes over so that the next intelligence received is passed to an arithmetic circuit 5. This circuit then works on this intelligence under control of the contents of decoder 4, this being indicated by the connection 6. Since the actual arithmetic circuit forms no part of the present invention, it is not described herein. The results of the computation leave the circuit 5 via channel 7 to equipment (not shown) which converts them to a code form convenient for recording on magnetic tape or for printing, or to some portion of the internal storage system.

At the end of the computation, the control circuit 2 receives a "ready" signal and the inlet switch changes over to feed the next received intelligence, which will be an instruction, to the decoder 4. This operation wherein alternate instructions and data for computation are received continues as long as is required. It will be seen that each instruction is individual to the numerical data which it precedes.

*The use of pre-recorded instruction*

In this case a series of instructions to be recorded are received sequentially from the tape machine 1 via control unit 2. The first instruction is, as usual, passed by the inlet switch 3 to the decoder 4. However, since it is the first of a series of instructions which have to be recorded, certain of its digits will form a combination characteristic of this fact. This combination will be recognised by the decorder 4. As binary notation is used, the first two digits have been selected to convey this information. If they are both "ones" (marks), then the decoder "knows" that the instruction is the first of a sequence to be recorded.

The first result of the detection referred to is that the decoder causes a gate 8 to open, which lets all subsequent digits pass to an intermediate store 9, known as Annex 1, via an electronic switch 10 known as the "annex in-switch." Special arrangements are provided to insert the first two digits of this instruction in the annex. The digits subsequent to the first two also pass to the decoder 4; at this stage these further digits stored in the decoder have no effect and so no effort is made to prevent this occurring, although it could be prevented, if desired, by a simple gating arrangement.

Thus we now have the first instruction in Annex 1, i.e. the first Annex 9. The annex in-switch 10 now changes over so that the next instruction will pass to the second annex, or Annex 2, 11. Further, with the mode of operation being described the inlet switch 3 does not change over. Hence the next instruction passes via gate 8 and switch 10 to the second Annex 11.

It is necessary now to consider the final storage circuit used for these standard instructions. This is provided by a magnetic track 12 on the periphery of a rotatable drum 13 with which is associated a read/record head 14. The instruction stored in the first Annex 9 must now be recorded in a particular portion of the track 12 at a speed suitable to the drum speed. This occurs under the control of the pulse supplies derived from the drum, which supplies will be described hereinbelow.

Annex 1 is connected via an electronic switch 15, known as the "annex out-switch," via a control circuit 16 which ensures that recording occurs at the correct time, and an amplifier 17 to the recording winding of the compound head 14. When the time is ripe, the instruction in the first annex 9 is fed via 15, 16 and 17 to 14 for recording. The annexes are formed by pattern movement or shifting registers for which the step pulses are obtained from the drum for this operation. Separate step pulse supplies are used when the information enter these registers via switch 10. As soon as an instruction is fully recorded on the drum, the switch 15 changes over. Hence it is now ready to transfer the second instruction from the second annex 11 (Annex 2) to the track, but since the speed at which instructions pass the inlet switch 3 will, in general, be considerably less than that at which they pass to the drum, no transfer will occur at this time.

As soon as the second instruction is in the annex, 11, switch 10 changes back to feed the first annex 9, and transfer can now occur from Annex 2 to the drum track. This operation continues until the reception of the last instruction. This is received in the normal manner, passing via gate 8, switch 10, Annex 1 or 2, switch 15, control circuit 16, and amplifier 17 to the head 14.

However, the first two binary digits are so arranged as to indicate that it is the last instruction. Hence recording is complete.

The next intelligence item to be received will be an instruction whose first two binary digits form a prefix for an instruction identifying the instructions to be used for the next set of data. The code in the two first binary digits used for this discrimination is:

00 Normal instructions for a single number following.
11 First of a set of instructions to be recorded.
10 Last of a set of instructions undergoing recording.
01 Instructions specifying which recorded instructions are to be used for the following set of data numbers.

For an example, consider that all instructions comprise 35 binary digits, and it is assumed in this case that a set of instructions will only comprise 33 instructions. Hence in this instruction a 1 in any place after the first two digits indicates that a particular instruction is to be used. Thus if the signal relates to five sets of data for which instruction 3, 4, 5, 9 and 11 respectively are to be used it will be:

01, 0011100010100 . . .

Each "1" after the first two places identifies an instruction.

This instruction enters the decoder 4, and when the latter notes its first two digits as 01, it causes subsequent digits to enter a storage circuit 18. After this, the inlet switch 3 changes over and the first set of data passes to the arithmetic circuit 5.

Meanwhile, the read-out control circuit 19 is so controlled from the storage circuit 18 that the instruction corresponding to the first 1 stored therein is read out and fed via amplifier 20 and circuit 19 to gate 8, which is open to allow that instruction to pass via switch 10 into the first annex 9. This will, in the example mentioned, be the third recorded instruction.

As soon as this instruction is in the annex, it is transferred by gating, indicated at 21, to the decoder from which it controls the arithmetic circuit 5 in the usual manner. When this computation is finished, a ready signal is sent to the inlet switch 3 to allow the next set of data to enter the arithmetic circuit 5. Meanwhile, control circuit 19 is so controlled from the storage circuit 18 as to read from the track 12 the instruction corresponding to the next 1 in the signal therein. This is in the present case instruction No. 4.

By this time the annex in-switch 10 is connecting gate 8 to annex 11, so that this instruction is stored therein. Transfer now occurs as usual to decoder 4, and computation follows, whereafter the next instruction is called for and used, and so on until the sequence ends, when inlet switch 3 restores to normal. Then another sequence can occur, or a normal single computation can occur, or even a new set of instructions can be inserted.

To ensure that the equipment is never called on to receive intelligence when not ready to deal with it, a ready/unready control indicated at 12A is shown, which prevents the supply of intelligence unless the equipment is ready to deal with it.

In the particular method of operation which has just been described, it will have been noted that the number of instructions used is equal to the number of the data numbers. This method is applicable where the equipment is used to control the recording of intelligence. An example of this is where the equipment according to this invention is used as part of the output of a high-speed digital computer. In this case the pre-recorded instructions each relate to a single item of intelligence, and are sent by the computer as a block. This assumes that the computer has to deal with numbers of identical blocks of operations, such as are involved in routine calculations.

Each instruction which the computer sends out in this application of the invention is used to control the recording of one number, this instruction specifying the conversion to be carried out by the arithmetic circuit and the method of recording the converted intelligence. The conversion can, for example, be a conversion from the binary notation, which has been assumed to be used by the computer, into, for example, decimal notations, or sterling notations, or weights or measures. The portion of the instruction stated to refer to the method of recording is used to convey such information as the number of digits to be recorded, positions of integer points, tabulations data, and the like. In this case individual results numbers from the computer are dealt with by the method wherein instructions and numbers alternate.

A further application of the invention where the number of instructions to be used equals the number of data numbers is to a computer which performs the actual calculations involved in routine mathematical operations. An example of such operations is the preparation of a payroll. Here for each employee to be considered, there are a number of computations to be performed. These include the number of hours worked at the normal rate of pay and the number of hours worked at overtime rates. Then there are deductions such as sports club, insurance, income tax, etc. all of these will involve similar calculations for large numbers of employees, the difference between the operations for individuals lying in which selection of these operations needs to be performed. It is convenient for such of these possible operations as are needed in each case to be performed in an invariable order.

Thus for each employee, a number of operations are to be performed which are selected from a larger number of possible operations. Since the instruction preceding the block of information selects from the pre-recorded instructions in both of the above named applications, it is designated a selecting instruction.

Clearly the invention is applicable to computational operations wherein the number of instructions used does not equal the number of data numbers involved. In this case, when the operations called for by an instruction have been completed, the completion of the operations can be used to extract from the storage arrangements the next of the pre-recorded instructions needed.

In the arrangements described, the pre-recorded instructions are stored on a single track on a magnetic drum. Each portion of track in which an instruction is stored is therefore regarded as being an instruction store, so that the drum track provides a number of instructions stores.

Where there are more possible instructions than there are digital places in a selecting instruction, a selecting instruction can include a portion consisting of one or more digital positions whcih are used to "tell" the equipment whether or not there will be a further selecting instruction. This will be mentioned in more detail later.

*Pulse generation*

The controlling pulses for operations which relate to the drum are controlled by permanent recordings on tracks of the drum.

The first of these tracks is the drum element pulse track 22, which has a mark recording aligned with each element position on all storage tracks used on the drum. Associated with this track is a read head 23, from which the output passes via amplifier 24 and pulse former 25 to form the drum element pulses DEP, each of which is a short pulse marking the beginning of an element position. The output from 25 is fed via a half-element delay circuit 26 to produce pulse train DEP*d*, i.e. drum element pulses delayed, whose purpose will be stated later.

The next track 27, the section track, has a mark recording aligned with each section of the track 12, each of these sections being capable of storing one instruction. This track has a read head 28, from which the drum section pulses DSP are obtained via amplifier 29 and pulse former 30.

The third track used for thus purpose is track 31, which has a single mark recording to indicate the overall zero point of the drum cycle. This gives the ZP output, one pulse per cycle of the drum, via read head 32, amplifier 33 and pulse former 34. This could be replaced by an additional recording on track 27 to mark the zero point, with a detection circuit therefor.

The only other pulses used are the step pulses SP and SP*d* (step pulses delayed). These could be produced by frequency division from DEP, or from an independent pulse generator. In any case SP*d* is produced by delaying SP.

*Circuit conventions*

Before the detailed description some explanation of the circuit conventions used is desirable.

Electronic gates, well known per se, are shown as circles with incoming controls shown as radial leads with arrow-heads touching the circle. Outputs are shown as radial leads with arrow heads pointing radially outwards. The number inside the circle indicates the number of controls which must be energised for the gate to deliver an output.

A counter comprising a number of single-component stages each of which is capable of assuming one of two conditions, on or off, is shown as a series of rectangles drawn in linear array. The counters shown, all count to the ends of their cycle and then reset during normal operation. At this point it is worth remarking that a counter having a large number of stages may be formed in any convenient and well known manner.

A multi-stable register is shown similar to a counter except that its longer dimension is shown vertical, whereas that of a counter is shown horizontal. A multi-stable register is similar to a counter in that only one stage is "on" at once, but it does not operate through a fixed cycle. Depending on circumstances, any stage can operate, and this extinguishes any previously operated stage. A bi-stable circuit, also known as a flip-flop, is a two stage multi-stable register.

A pattern movement register or shifting register is shown as a number of horizontally spaced rectangles connected by a line along their midpoints. Those shown have a small ring on the bottom right hand corners of their last stages, indicating that they do not continuously cycle.

An inverter is shown as a diagonally-bisected rectangle.

If the bistable and other circuit outputs were connected to all the gates which they control there would be a complex network of leads which would be difficult to follow. Hence these leads have been omitted and the short control leads to the gates have been given referenc indicating their origin.

In certain cases when an output is much used, it would be derived from a cathode follower controlled by the tube or the like causing that output. Similarly where a group of two or three controls are frequently used together it may be convenient to have a cathode follower controlled by that group of controls to perform the functions needed.

*Detailed description*

Before describing the operation of the circuits in detail, these circuits will be briefly described.

Figure 1:
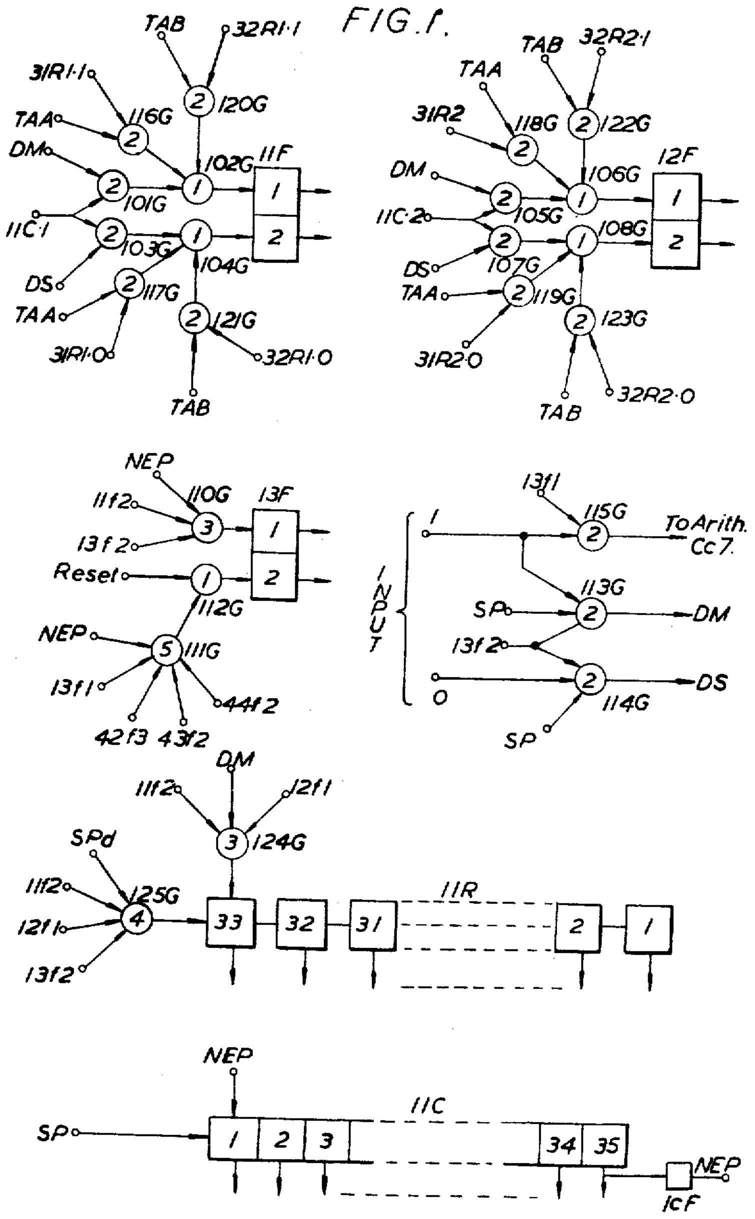

Fig. 1: The bistable circuits 11F and 12F are the two sections of the decoder which are used to store the two least significant elements of an instruction or signal. The other decoder sections have not been shown, since they are similar to 11F and 12F but have the appropriate controls, i.e. they are controlled by different outputs from the step pulse counter 11C. 13F is the inlet switch, 11R is an instruction signal store formed by a pattern movement register.

Figure 2:
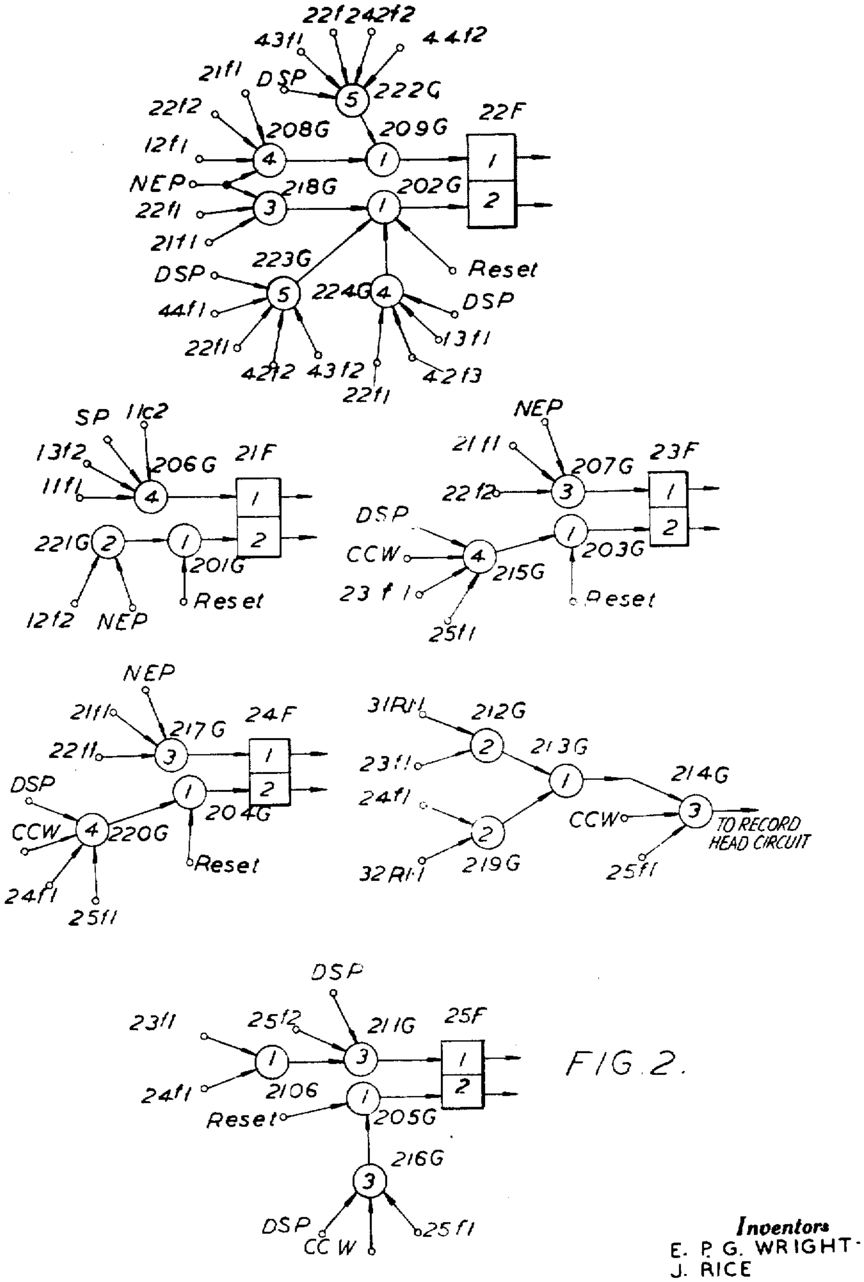
Figure 6:
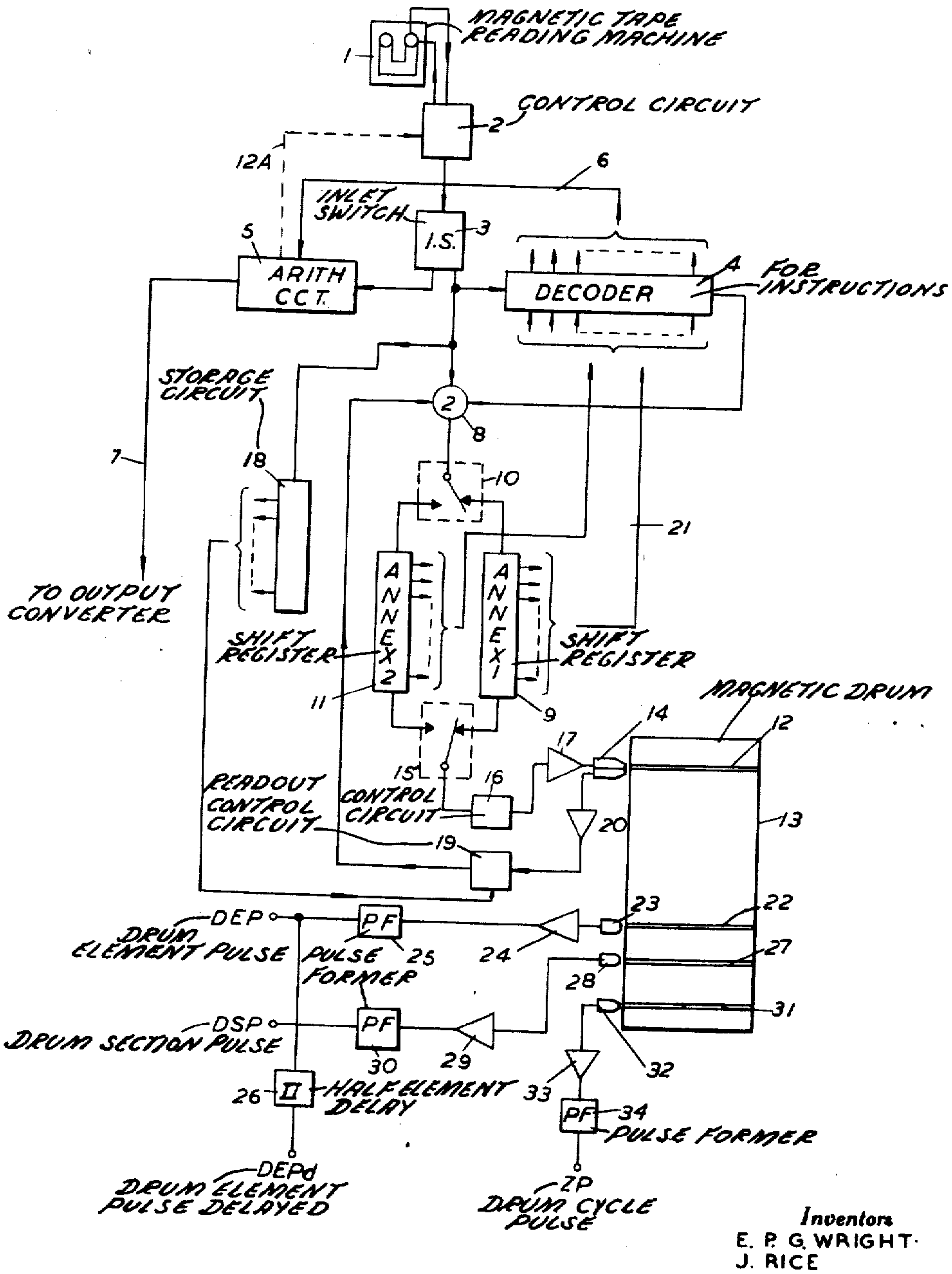

Fig. 2: 21F is the control circuit which allows information to pass into the annexes, 31R and 32R, designated Annex 1 and Annex 2 in Fig. 6. 22F is the electronic version of the annex in-switch shown on Fig. 6 as a contact, 10.

23F and 24F give the electronic version of the annex out-switch shown in Fig. 6 as a contact 15.

25F is a control circuit which is instrumental in providing the read in waveform which allows information to pass from the annexes to the drum store.

Fig. 3: The pattern movement registers 31R and 32R are the two annexes.

Figure 4:
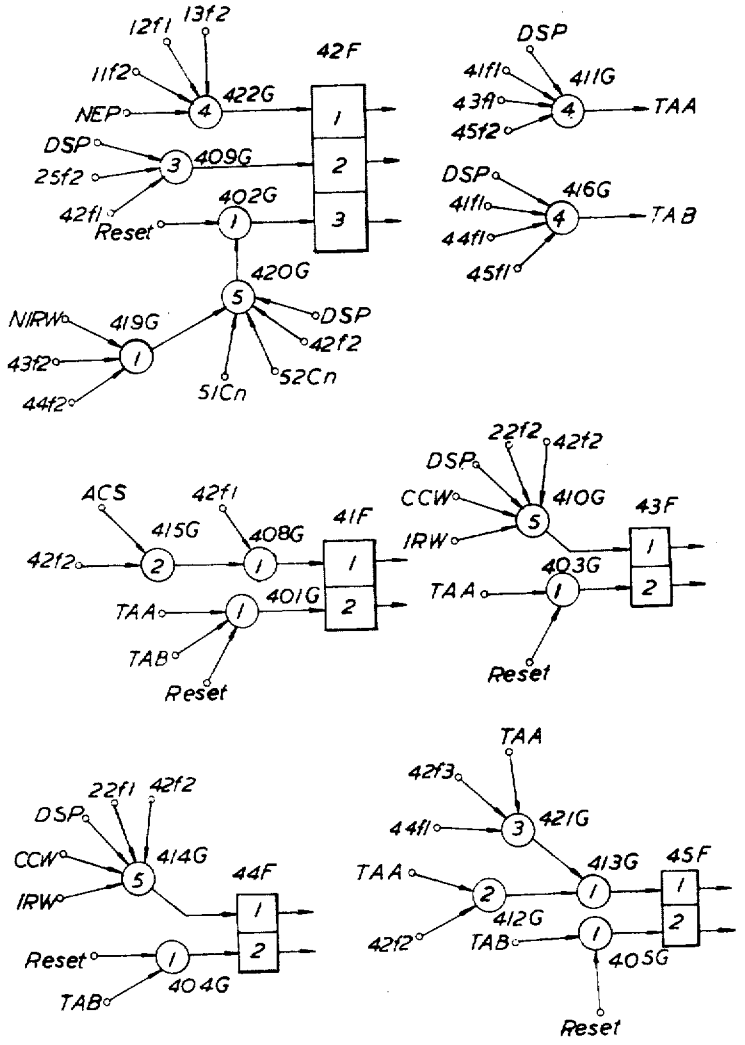

Fig. 4: 41F–45F in combination provides a control circuit which is concerned with reading off instructions already recorded on the drum which have to pass to the decoder via the annexes. Thus, this circuit has to provide the read out waveform and also supply a signal to permit the contents of an annex to be transferred to the decoder.

Incorporated in this arrangement is a circuit to provide ready/unready signals to control the supply of data to the arithmetic circuit.

Figure 5:
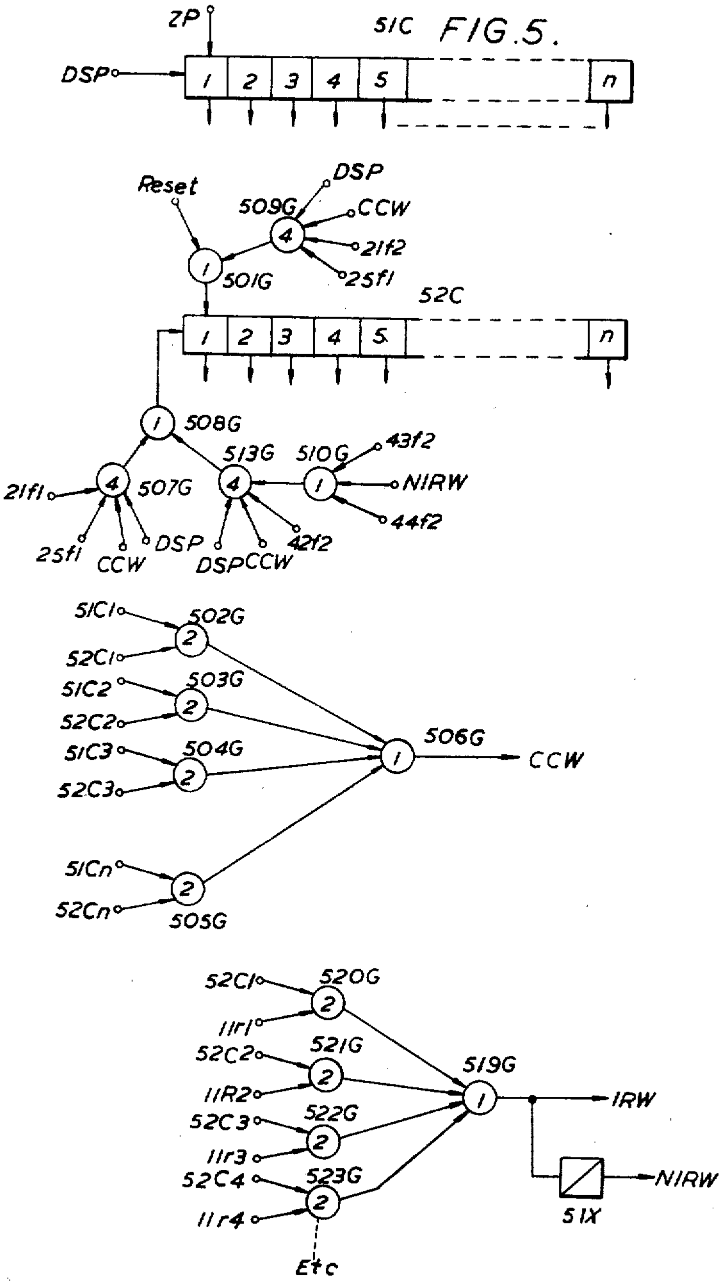

Fig. 5: 51C is a counter which is used to locate the sections of the drum track which are to receive the various instructions. The maximum number of instruction which may be stored is taken to be "*n*." It should be understood that this counter is stepped by means of drum section pulses, DSP, there being one of these at the beginning of each section of the storage track on the drum surface.

52C is a counter which is used to count in the instructions being read onto the drum and later to count out these same instructions. This counter, like 51C, also has "*n*" positions. By means of a counter coincidence gating arrangement it is possible to read in an instruction into the correct storage section. A second coincidence gating network, with 11R, is used to read out a required instruction.

It will be noted that the references for gates, bistable and multistable circuits, counters and pattern movement registers all have as their first digits the number of the figure in which they appear.

Initially, when the equipment is first brought into use, a signal is applied to the reset control connection, say, by means of a switching-on relay contact, so that the required elements of the various flip-flops and the first element of counter 52C are caused to conduct. In the case of the annex read-in and drum read-out circuits (Figs. 2 and 4), these are set in such a way that no reading in nor reading out can take place. This will be understood from the circuit description. The annex-in switch, 22F, is set so that, if the two control binary elements indicate the beginning of a sequence of instructions to be recorded, the first of these instructions will be passed into annex 31R. The inlet switch, 13F, will have *13f2* energised, that is, the inlet switch is set in readiness to pass information via 113G and 114G into the decoder.

*Operation for alternate signals and data*

Assume that the received intelligence, is an instruction which applies to the data following it. In this case the two least significant elements, which are received first, will both be "0." When the first element of the instruction passes from the tape machine the first step pulse SP, opens 114G and, since the step pulse counter has its first stage 11C.1 operated at that time, 103G and 104G open, causing **11*f*2 to be energised. The step pulse also moves the step pulse counter to its second stage operated and, in consequence, the second binary element of the instruction will cause 12*f*2 to be energised via 107G and 108G. The remaining binary elements of the instruction will be received and stored in the pertinent sections of the decoder in like manner. Since both 11*f*2 and 12*f*2 are energised, the read-in and read-out control circuits remain quiescent. When the number end pulse, NEP, is generated at the end of the instruction cycle by the cathode follower 1CF, 110G opens under control of both 11*f*2, 13*f*2 and NEP, causing 13*f*1 to be energised, i.e. the inlet switch is now positioned in readiness to direct the numerical data which follows the instruction (via 115G**) to the arithmetic unit.

The data which is associated with the received instruction now passes to the arithmetic unit where it is operated on as required by the instruction. At the end of this cycle there is anoher NEP and this opens 111G because **42*f*3, 43*f*2 and 44*f*2 are still energised, so that 112G opens in turn, causing 13*f*2 to be energised in readiness for a further instruction cycle. So long as such instructions are being received the circuit behaves in the manner described. The NEP produced at the end of the computation is produced under control of 11C35**, as for the case when an instruction has been received. Since the data following the instruction may require less binary positions than the maximum allowed, a separate circuit could be used to produce the NEP as has been described in the co-pending application of Wright, Weir, and Rice, Serial No. 450,184, filed August 16, 1954, for both instructions and data. Since, as already mentioned, intelligence can only be received when the equipment is ready to deal with it, this method of generating NEP has no bad effect.

*Receiving and recording standard instructions*

The case will now be considered when it is desired to record in the drum store a number of predetermined standard instructions for use for future computation. When the first of these instructions is to be received, the inlet switch, 13F, will have **13*f*2 energised and, since the two least significant elements in this the first instruction will both be "1," 113G opens for both and, in consequence, 101G and 102G open for the first binary element to cause 11*f*1 to be energised, and 105G and 106G open for the second binary element to cause 12*f*1** to be energised.

Since the fact that the first element is "1" indicates that the first instruction to be recorded is being dealt with, it is possible to be ready to operate the control circuit which allows the remainder of the instruction to pass into an annex. This is done by using the step pulse which causes **12*f*1 to be energised, to open 206G and cause 21*f*1 to be energised, 21*f*1 being the control which admits information received via the inlet switch into the annex system. Since the two least significant binary elements will have been received before this happens, it is necessary to insert these two elements into the annex by separate means. However, since this applies to the first instruction only and this instruction is to be passed to 31R, the gate concerned in the insertion, namely 31G, is necessary for 31R but not for 32R. Whilst on this point it should be noted that no separate insertion of the first two elements occurs for later instructions passed into 31R, this being prevented by the fact that 21*f*2 on 31G will not then be energised. The opening of 31G causes 31R34 and 31R33 to be energised, denoting 11** for the first two elements.

The annex in-switch, 22F, has **22*f*2 energised at this time so that the third binary element passes via 32G and 33G into 31R35**. Shortly afterwards SP*d*, which is a step pulse delayed by a small amount to enable information to be read in before stepping of the annex contents takes place, opens 34G and 35G and the three elements stored at that time are each stepped along one position, so that now 31R32 and 31R33 will be energised, the state of 31R34 depending on the valve of the third binary element. In similar manner the remaining elements of the first instruction pass via 32G and 33G into 31R35 and the pattern is stepped each time so that eventually the whole of the first instruction to be recorded is stored in 31R. A number end pulse, NEP, now occurs, but since **11*f*1 is energised, 110G remains closed and 13F remains with 13*f*2** operated ready to receive another instruction. That is, the inlet switch change-over has been disabled.

However, NEP occurring with **12*f*1 energised opens 208G and 209G, and the annex in-switch changes over to 22*f*1 energised; 21F remains with 21*f*1 energised so that further instructions can pass into the annex system. The second instruction now passes via the inlet switch, 13F, and a gating arrangement similar to that described for 31R into 32R. This time and for further instructions all the elements pass directly into the correct register under control of 21*f*1** and do not require any artificial insertion of the two least significant elements.

The instruction now stored in 31R must now be passed to the appropriate storage section of the drum. The NEP which causes 22F to change over also opens 207G, causing **23*f*1 to conduct; the latter indicates that an instruction is ready to be passed from 31R. The first drum section pulse, DSP, to occur after this opens 211G, 210G being opened by 23*f*1, and 25*f*1 is energised. At this time counter 52C will have its first stage operated. When 51C, which is being stepped by DSP pulses, steps to its first position, the coincidence waveform, CCW (produced by 502G), applied in conjunction with 25*f*1 to 214G prepares this gate to allow information stored in 31R** to pass to the record head.

Although there will have been previous coincidences of the two counters no previous recording can have taken place because of the control **25*f*1. The element stored in 31R1 will be the least significant element of the first instruction and will be a "1." Thus 31R1 will be energised and in conjunction with 23*f*1 will open 212G and hence 213G. Thus, for the first element, 214G** will open a "1" is recorded in the first element position of the drum section which is to receive the first instruction of the sequence being received. A delayed drum element pulse, DEP*d*, then occurs and opens 36G and 35G, the result being that the pattern stored in 31R is stepped one position. Accordingly the second binary element passes to 31R1 and is passed via 212G, 213G, and 214G to the second element position in the appropriate section of the drum store. The patern in 31R is again stepped by means of DEP*d*. Similarly the remaining elements are passed via 31R1 to the drum and will be recorded in the correct element positions. At the end of the recording section, another drum section pulse, DSP, occurs; this opens 215G and 203G to cause **23*f*2 to be energised, indicating that 31R has been cleared of the first instruction. This pulse DSP, of course, also steps the counter 51C to its second position. At the same time 216G and 205G are opened to cause 25*f*2 to be energised and, in consequence, the recording circuit is closed at 214G and the stepping pulses are cut off at 36G. The same DSP opens 507G and 52C steps to 52C2 in readiness for recording the second instruction which at that time is being passed into 32R. It will be noted that every section of 31R and 32R** has a 1 output which is energised when that stage stores mark (1) and an 0 output, which is energised by an inverter X when that stage stores space (0).

In any practical case the time taken to record an instruction on the drum would be less than the time taken to receive an instruction fully into an annex. This is so even in the worst case where the correct recording section of the drum is just missed, so that recording needs just over one full drum cycle. Since there must be a coincidence of the positions of 51C and 52C in each revolution, the first instruction will have been recorded from 31R onto the drum before the end of the second instruction entering 32R. Thus 31R will be ready to receive the third instruction before the second is fully received by 32R. This enables the drum reading-in circuit to be simplified, for there is no necessity to have a busying arrangement to prevent the reception of new instructions when there is no available free annex. At the same time, one annex at a time only can be ready to pass information to the drum and there is no requirement for a circuit to determine which is the next annex to be used to pass an instruction to the drum store. As will be seen these considerations do not apply to the reading out arrangement.

When the second instruction has been received by 32R, NEP with 22*f*1 energised opens 217G and 24*f*1 is energised indicating that the second instruction is ready for recording. The same NEP opens 218G and 202G and 22*f*2 is energised in readiness for passing the third instruction to 31R. 24*f*1 opens 210G and the first DSP following the NEP opens 211G and again 25*f*1 is energised. With 25*f*1 energised the contents of 23R are recorded on the drum via 219G, 213G, and 214G in the same way as described for 31R but, since 52C will have position 2 energised, the coincidence waveform, CCW, will be from 503G and the second instruction will be stored in the second instruction section of the drum, as required.

After the recording has been made, 52C is stepped by means of 507G and 508G to position 3 ready for recording the third instruction which will be passing to 31R. Recording of further instructions continues as described, 22F directing instructions to the correct instruction annex and 23F, 24F and 25F causing recording of the instructions to be made on the drum, the coincidence waveform ensuring that recordings are made in the correct storage section.

*Receiving the last instruction of a sequence*

The last instruction in the series to be recorded has 10 in the two least significant binary element positions. This instruction is received by whichever annex is associated with the input by means of the annex in-switch at that time, there being no difference between this operation and the reception of any other instruction. The difference of operation occurs when the NEP is received at the end of this instruction.

When the NEP is received, if 22*f*1 is energised at this time, that is, 32R is receiving the last instruction, 22F is returned in the normal way by means of 218G to 22*f*2 energised so that the annex in-switch is positioned in readiness for 31R to be used for receiving the first instruction to be read from the drum store. However, if 22*f*2 is energised at the time NEP is received, 208G remains closed under control of 12*f*1 and the annex in-switch remains with 22*f*2 energised for the reason stated. The NEP also opens 221G, because 12*f*2 will now be energised because of the "0" in the second binary element position in the instruction, and, in consequence, 21*f*2 is energised and the reading in gates from the input to the annexes will now be closed, that is, 32G and the equivalent gate for 32R are closed. The last instruction is recorded in the position on the drum assigned by 52C as previously explained, but since 21*f*1 is no longer energised 507G remains closed and 52C does not step to the next position when DSP occurs at the end of the recording operation. Instead 509G and 501G open and 52C is restored to the condition with the first position conducting. This arrangement makes it possible to record a number of instructions less than the maximum, *n*, for which storage sections have been allocated.

The counter, 52C, is now positioned ready for reading off the first instruction of the series just recorded.

A sequence of sets of numerical data will be received after the recording of these instructions has taken place, these sets of data being preceded by an instruction signal identifying which instructions are to be used. Continuing the operation, it is now necessary to read off such of the instructions as are needed in order and to pass them to the decoder when required.

The equipment is now ready to receive this instruction signal.

*Reading off recorded instructions*

Having recorded the sequence of instructions, the next instruction can take one of the following forms:

(*a*) A "normal" instruction (00) for use for an immediately following number.

(*b*) A new set of standard instructions (11).

(*c*) Select the following standard instructions (preceded by 01).

Alternative (*b*) is unlikely at this stage, for it is assumed that a new set of standard instructions would replace those already recorded, this providing a simpler form of operation. However, it could take place at a later stage in a particular programme, in which case the ensuing operation would be as already described. It could also be required if a set of instructions were erroneously recorded. For case (*a*) the operation would also be as previously described. Case (*c*) will now be explained in more detail.

The first two elements to be received will be 01, which will cause 11*f*2 and 12*f*1 to be energised and, as a result, 124G and 125G are prepared, the former to pass further elements of the instruction into 11R and the latter to cause the necessary stepping of the pattern. As shown in Fig. 1 there are 33 positions in 11R for it was assumed that there are 35 elements in an instruction, 2 of these being used for the discriminating elements. For simplicity in explanation, it has been assumed that the maximum number, *n*, of standard instructions is equal to or less than 33 so that one select instruction can designate all of the standard instructions.

Although no circuit arrangement is shown for this purpose, it is clearly possible to provide an arrangement in which the number of standard instructions can be greater than the number permitted by one select instruction. In this case, one further element of the select instruction would be given a new function. This element if "1" would indicate that the select instruction would be continued by a further select instruction, 32 elements being left to indicate which standard instructions were required. The "continuation" select instructions would each indicate which of a further number of up to 32 standard instructions was to be used. The last of the select instructions would have "0" in the special element, this fact being used to change over the inlet switch at the end of this cycle in readiness for receiving data on which computation is to be performed. For this method of using select instructions, the register 11R would have sufficient positions to take the maximum number of select instructions, i.e. it would include one position for each standard instruction.

Continuing the description, the positions of 11R at the end of the select instruction will be energised in accordance with the information supplied. 11*r*1, 11*r*2, 11*r*3 etc., energised indicates that the first, second and third standard instructions respectively are required and the same positions non-energised indicate that these standard instructions are not required. Throughout this cycle, the recording and reading-off circuits will have been unaffected.

When NEP is produced at the end of the select instruction, 110G is opened and 13*f*1 is energised in readiness for receiving the first of the sequence of data. Also 422G opens, before 13*f*2 is rendered non-operated, causing 42*f*1 to be energised, which in its turn opens 408G and causes 41*f*1 to be energised. The latter gives an "unready" or busy signal, used in the control of circuit 2 of Fig. 6, to prevent the first set of data from being passed until the first required instruction has been read off from the drum and passed via 31R to the decoder. The first DSP after the energising of 42*f*1 opens 409G and 42*f*2 is energised. This step is included so that 42*f*2, which is a control of the reading-off gates, cannot be energised until the beginning of an instruction, thus preventing mutilation of the first instruction to be read off.

To simplify the explanation, it will be assumed that the first and third standard instructions are not required but the second and fourth standard instructions are required. This requirement will be indicated by the fact that 11*r*1 and 11*r*3 will be non-energised and 11*r*2 and 11*r*4 will be energised when the select instruction has been received. At this time 52C will have 52C1 energised in readiness for reading-off the first standard instruction if it is required. However, 520G will be closed because 11*r*1 is not energised and the gates 521G—523G will be closed by 52C irrespective of 11R. Hence 519G is closed and IRW will be at zero potential and, because of the inverter 51X, NIRW will be at a positive potential.

When 51C next steps to position 1, indicating that the first standard instruction is in position for reading off, 37G and 38G will be closed due to absence of IRW, so that the first instruction is not passed to 31R. The DSP at the end of this coincidence cannot open 410G, again because of the absence of IRW, and so 43*f*1 is not energised. 43*f*1 indicates that an instruction has been read out into 31R, so that the fact that it is not energised indicates that no instruction has been read out into 31R. 44F is not affected, for the annex switch 22F will have 22*f*2 energised at this time in readiness for the first instruction to be read out to pass to 31R.

The DSP at the end of the first coincidence of 51C and 52C opens 513G, 510G being opened due to all three controls, and 52C steps to position 2. With 52C on this position, 521G will open, because 11*r*2 is energised; IRW will now be positive and NIRW at zero potential. In consequence, for the coincidence of 51C2 and 52C2, 37G is opened to allow the second standard instruction to pass to 31R. Stepping of the pattern movement takes place under control of 38G which will be open to admit pulses DEP*d*. At the end of the coincidence, the following DSP opens 410G causing 43*f*1 to be energizsed to indicate that 31R contains an instruction which is to pass to the decoder. The transfer to the decoder now takes place.

The next DSP find 41*f*1 and 43*f*1 both energised which opens 411G producing the "Transfer (out of) Annex 1" pulse, TAA, which controls 116G—119G, and other similar gates to the other decoder bistable circuits. The contents of 31R1 pass to 11F, the contents of 31R2 pass to 12F, etc., and so the instruction is stored in the decoder in the same positions as it would have been in if it had passed in direct from the inlet. The DSP which causes transfer also opens 222G, causing 22*f*1 to be energised, so associating 32R with the read head in readiness for receiving the next instruction from the store if required, during the next CCW. It should be noted that the controls on 222G and 223G are such that the annex in-switch only changes over during the reading out operation when one annex has been filled and the other is empty and waiting for an instruction; the reason for this is given later.

TAA not only causes transfer to the decoder, but also opens 401G to energise 41*f*2, the output from 41*f*2 indicating that the first set of data can be sent in to the arithmetic unit 5 Fig. 6. This circuit then operates on the received data under control of the instruction in the decoder. Also 412G and 413G open and 45*f*1 is energised to indicate that the next instruction which has to pass to the decoder must be from 32R. The device is necessitated by the fact that both annexes may contain new instructions which cannot be passed to the decoder because the previous set of data is still being operated on in the arithmetic circuit under control of a previous instruction. When the next instruction has passed from the drum to 32R, 414G is opened and 44*f*1 energised. If the arithmetic circuit is still dealing with the first set of data 41*f*2 will still be energised, so that TAB, the "Transfer (out of) Annex 2" pulse, cannot be generated by 416G. However, the next DSP after 44*f*1 is energised opens 223G and the annex in-switch changes to 22*f*2 energised to direct the third required standard instruction to be read from the drum into 31R, the contents of which have already been "passed" to the decoder.

To return to the operation of the read-in and read-out systems, the DSP which opens 410G also opens 513G, for at this time 510G is open due to both 43*f*2 and 44*f*2, and 52C is stepped to position 3. Because the third standard instruction is not required, IRW will be at zero potential so that for the coincidence of 51C3 and 52C3 the gate feeding to 32R will remain closed; the annex in-switch will have changed over to allow the next required instruction to pass to 32R. Thus the third instruction will not pass to 32R and 44*f*2 will remain energised. The DSP at the end of the coincidence will step 52C to position 4, 510G being opened by both 44*f*2 and NIRW, and once again IRW will become positive. As a result, during the coincidence of 51C4 and 52C4, the fourth instruction will be read off the drum and passed into 32R from whence it will pass to the decoder as soon as the instruction previously passed to the decoder has performed its function. This operation is initiated by the signal ACS, generated in the arithmetic unit when the arithmetic operation is completed, opening 415G to energise 41*f*1. The passing of the instructions to the decoder, the control of the order in which they pass from the annex system, the switching of the annex in-switch and the production of the ready/unready signal have already been described in detail for transfer from 31R. They now occur via 120G—123G and corresponding gates for other bistable circuits, under control of TAB.

Further standard instructions will be read off, as required, from the drum into the apparopriate annex and passed to the decoder. If an instruction is required, IRW will be positive for the pertinent coincidence, so that the instruction may be read off whenever there is a free annex. Should there be no free annex during the coincidence, 43*f*2 and 44*f*2 will close the annex reading-in circuits and also prevent 52C from stepping. This situation will remain until there is a free annex, when the instruction will pass to the annex and 52C will step ready to deal with the next instruction. Should 52C be indicating a position of an instruction which is not required, irrespective of the condition of the annex system, NIRW opens 510G allowing 52C to make a further step. This latter feature makes it possible to step 52C to the next required instruction even when both 31R and 32R are waiting to discharge their contents into the decoder, and so give a time saving facility.

The operation will now be considered when 52C steps to position *n*, the final position. Even though the number of standard instructions for a particular programme may be less than the maximum number, *n*, 52C will eventually step to this position under control of 513G. If the *n*th standard instruction is required, 52C will remain on position *n* until the instruction has been read off into an annex after which it will step to position 1. If the *n*th instruction is not required, 52C will also step to position 1 at the end of the coincidence between 51C*n* and 52C*n*. In both cases, 419G will be opened by at least one control, so that at the end of this coincidence 420G opens and 42*f*3 is energised; this cuts off the reading-out circuits from the drum to 31R and 32R. At this time one or both of 31R and 32R may contain an instruction waiting to be passed to the decoder. This is indicated by either or both 43*f*1 and 44*f*1 energised.

Thus 111G cannot open and **13*f*1 will still be energised to allow results to pass to the equipment. When the last instruction has passed to the decoder, both 43*f*2 and 44*f*2 will be energised so that when NEP is generated at the end of the cycle in which the last result passes to the equipment, 111G opens and 13*f*2** is energised in readiness to receive the next instruction on the input channel. The equipment is now back to its initial condition and subsequent operations will take place according to the first two elements of the next instruction.

Although the instruction selection elements have been described as passing to a register where they are temporarily stored to control further operations, by suitable circuit arrangements it would be possible to pass the select instruction via one of the original annexes to a separate track on the drum. The elements so recorded could then be used to control the reading off of the required instructions. This course has not been followed for it is considered that the arrangement as described is simpler to explain than the further modification mentioned.

It will be noted that transfer from 31R or 32R to the decoder does not eliminate the instruction in the register concerned. However, when the next instruction to enter that register is received, in being driven in it drives out any intelligence already there.

What we claim is:

1. Equipment for handling intelligence in various ways, comprising stores containing and presenting for selection a series of individual predetermined multi-element instructions and a binary store for preliminarily receiving and retaining unchanged, through a course of utilization of instructions in said series, any of various suitable selecting instructions, said binary store having as many digit positions as there are individual instruction stores, each digit position indicating and controlling selection only of a corresponding instruction store, and means connected to said individual instruction stores and controlled by said binary store for utilising such of said predetermined instructions and rejecting others of said series as are indicated by a selecting instruction stored in said binary store.

2. Equipment, as claimed is claim 1, further comprising an input channel for receiving intelligence to be handled, and means for receiving a selecting instruction over said input channel and for feeding it therefrom to said binary store.

3. Equipment, as claimed in claim 2, further comprising means for receiving a series of instructions for insertion in said instruction stores over the input channel and means for placing the first received instruction in a first instruction store, the second received instruction in a second instruction store, and so on.

4. Equipment, as claimed in claim 3, in which a selecting instruction has a portion additional to that used to select from said predetermined instruction stores, which additional portion is used to indicate whether a further selecting instruction is to be used, said equipment further comprising means connected to the instruction-receiving means and to the binary store and responsive to an indication that a further selecting instruction is to be used for entering said further selecting instruction in said binary store, whereby said utilising means uses the instructions indicated by said further selecting instruction as well as those indicated by the first-named selecting instruction.

5. Equipment, as claimed in claim 4, in which the means for entering said selecting instructions enters them in different portions of the same binary store.

6. Equipment, as claimed in claim 4, in which the instruction stores comprise a serial storage device in which said predetermined instructions are stored one after the other, each portion of the serial storage device which contains an instruction forming one of said instruction stores.

7. Equipment, as claimed in claim 6, and in which said serial storage device is an endless magnetic track on the periphery of a rotatable drum.

8. A computer comprising storage means for receiving from source means and replaceably storing a series of predetermined multi-element instructions, means for rendering the instructions in said series sequentially available for selection in cyclically repetitive manner, means for selecting any one of a number of combinations of said stored instructions for a computation to be performed, the sequence in which the instructions in combinations of said stored instructions are used being invariable and determined by the sequence in which the stored instructions are rendered available for selection, said selecting means being responsive to a selecting instruction received by the computer which specifies which combination of said stored instructions is to be used in respect of a particular computation.

9. A computer, as claimed in claim 8, in which the selecting means comprises a binary store in which a selecting instruction is stored on reception thereof, said selecting instruction having a digit position for each of said individual instructions, and means responsive to a digit of one kind in one of said digit positions to use the instruction which corresponds to that digit position.

10. A computer, as claimed in claim 8, further comprising an input channel over which data on which computations are to be performed is received, and means for receiving a selecting instruction over said input channel.

11. A computer, as claimed in claim 10, further comprising means for receiving a series of instructions for insertion in said storage means over the same input channel as that over which is received the data on which computations are to be performed.

12. A computer, as claimed in claim 11, in which a selecting instruction has a portion additional to that used to specify the combination of said predetermined instructions to be used, which additional portion is used to indicate whether a further selecting instruction is to be used, said computer further comprising means responsive to said additional portion for causing the further selecting instruction in addition to the combination of instructions specified.

13. A computer, as claimed in claim 12, and in which said storage means is an endless magnetic track on the periphery of a rotatable drum.

14. Equipment for handling intelligence in various ways, comprising stores for receiving and temporarily storing individual multi-element instructions and a binary store for receiving and temporarily storing a selecting instruction, said binary store having as many digit positions as there are individual instruction stores, each digit position corresponding to and controlling selection of one of said individual instruction stores, data source means, means for entering a series of the multi-element instructions from said source means into said individual instruction stores and for subsequently entering a selecting instruction in said binary store to provide in each digit position a select or alternative skip indication for the corresponding individual instruction store, means for sequentially testing one after another of the digit positions of the binary store for select or skip indications, and utilization means connected to said individual instruction stores and controlled by said testing means according to select or skip indications in said digit positions for sequentially utilizing or skipping the instructions stored in the corresponding individual instruction stores.

15. Equipment comprising an arithmetic unit to process data under control of applied instructions, a series of stores for replaceably storing multi-element instructions, means for rendering the instruction stores sequentially available for selection in cyclically repetitive manner, additional storage means having a series of sections respectively corresponding to said series of stores and adapted for replaceably storing a selecting instruction, source means for instruction data, circuits for entering instructions from said source means into the series of stores and subsequently entering a selecting instruction from said source means into the additional storage means to provide in each section a select indication or an alternative skip indication, means including a counter for testing one section after another of the additional storage means for a select or skip indication and for producing related manifestations, means controlled by a select manifestation produced by the testing means upon detecting a select indication in a said section for selecting the corresponding store to apply the instruction stored thereby to said arithmetic unit, and means controlled by either a select or a skip manifestation produced by the testing means for stepping said counter to enable the testing means to test the next section of said additional storage means.

16. Equipment as defined in claim 15, said source means comprising record material bearing a series of instructions for entry into said stores and pertaining to a major group of data, the record material bearing successive sub-groups of data following said series of instructions, each said sub-group being preceded on the record material by a selecting instruction individual to the following sub-group, each selecting instruction including a common codal designation, the entry circuits being controlled by said codal designation for routing the selecting instruction to said additional storage means, and means also controlled by said codal designation and automatically effective upon completion of entry of the selecting designation for routing data from the following sub-group on the record material into said arithmetic unit.

References Cited in the file of this patent

UNITED STATES PATENTS

| | | |
|---|---|---|
| 2,611,813 | Sharpless | Sept. 23, 1952 |
| 2,639,859 | Serrell | May 26, 1953 |
| 2,679,638 | Bensky | May 25, 1954 |
| 2,680,239 | Daniels | June 1, 1954 |
| 2,797,862 | Andrews | July 2, 1957 |

OTHER REFERENCES

"A Functional Description of the EDVAC" by Moore School of Engineering, Univ. of Penn., Nov. 1, 1949, vol. I, pages 1–1 to 1–6, vol. II, Figs. 104–10LD–6 (7 pages total).

"Description of a Magnetic Drum Calculator," Annals of the Computation Laboratory of Harvard University. vol. XXV, pages 11, 21–26, 35, 36 (9 pages).